US010601980B1

(12) United States Patent
Engelke et al.

(10) Patent No.: US 10,601,980 B1
(45) Date of Patent: Mar. 24, 2020

(54) CAPTIONING SYSTEM AND METHOD FOR THE VISION IMPAIRED

(71) Applicant: ULTRATEC, INC., Madison, WI (US)

(72) Inventors: Robert M Engelke, Madison, WI (US); Christopher R Engelke, Verona, WI (US); Kevin R Colwell, Middleton, WI (US); Troy Vitek, Waunakee, WI (US)

(73) Assignee: Ultratec, Inc., Madison, WI (US)

( * ) Notice: Subject to any disclaimer, the term of this patent is extended or adjusted under 35 U.S.C. 154(b) by 458 days.

(21) Appl. No.: 14/854,623

(22) Filed: Sep. 15, 2015

Related U.S. Application Data

(60) Provisional application No. 62/051,158, filed on Sep. 16, 2014.

(51) Int. Cl.
H04M 1/725 (2006.01)
G09B 21/00 (2006.01)
G09B 21/04 (2006.01)
G10L 15/26 (2006.01)

(52) U.S. Cl.
CPC ...... H04M 1/72591 (2013.01); G09B 21/003 (2013.01); G09B 21/008 (2013.01); G09B 21/009 (2013.01); G09B 21/04 (2013.01); G10L 15/26 (2013.01)

(58) Field of Classification Search
CPC ............ H04M 1/72591; G09B 21/003; G09B 21/008; G09B 21/009; G09B 21/04; G10L 15/26
See application file for complete search history.

(56) References Cited

U.S. PATENT DOCUMENTS

| 4,713,495 | A | * | 12/1987 | Jalava | G09B 21/04 178/2 R |
| 5,580,251 | A | * | 12/1996 | Gilkes | G09B 21/003 340/407.1 |
| 5,909,482 | A | * | 6/1999 | Engelke | G10L 15/26 379/52 |
| 6,603,835 | B2 | | 8/2003 | Engelke et al. | |
| 8,515,024 | B2 | | 8/2013 | Engelke et al. | |
| 2002/0085685 | A1 | * | 7/2002 | Engelke | G10L 15/26 379/52 |

(Continued)

OTHER PUBLICATIONS

Ramirez-Garibay, Fernando, et al. MyVox—Device for the communication between people: blind, deaf, deaf-blind and unimpaired, Global Humanitarian Technology Conference (GHTC), 2014 IEEE, pp. 506-509 (Year: 2014).*

(Continued)

Primary Examiner — Nathan Hillery
(74) Attorney, Agent, or Firm — Quarles & Brady LLP

(57) ABSTRACT

A communication system for communicating between a hearing user using a hearing user's communication device and an assisted user, the communication system comprising a relay that receives a hearing user's voice signal and converts that voice signal to text, a text to braille converter that receives the text generated at the relay and converts that text to braille data, a braille display device that is capable of generating braille messages that can be detected by an assisted user via touch and an assisted user's captioned device that receives the braille data and uses the braille data to drive the braille display device to generate braille messages for the assisted user to sense.

13 Claims, 5 Drawing Sheets

(56) References Cited

U.S. PATENT DOCUMENTS

| | | | |
|---|---|---|---|
| 2005/0004801 A1* | 1/2005 | Liebermann | G10L 13/00 704/271 |
| 2007/0055938 A1* | 3/2007 | Herring | G06F 17/30905 715/729 |
| 2008/0145822 A1* | 6/2008 | Bucchieri | G09B 21/003 434/114 |
| 2009/0055192 A1* | 2/2009 | Liebermann | G10L 13/00 704/271 |
| 2010/0109918 A1* | 5/2010 | Liebermann | G10L 13/00 341/21 |
| 2011/0170672 A1* | 7/2011 | Engelke | H04M 11/066 379/52 |
| 2013/0079061 A1* | 3/2013 | Jadhav | H04M 1/72547 455/563 |
| 2013/0308763 A1* | 11/2013 | Engelke | H04M 11/066 379/52 |
| 2014/0016867 A1 | 1/2014 | Maurer et al. | |
| 2016/0224116 A1* | 8/2016 | Hagedorn | G09B 21/003 |

OTHER PUBLICATIONS

Ladner, Richard E., Communication Technologies for People With Sensory Disabilities, vol. 100, No. 4, Apr. 2012 | Proceedings of the IEEE, pp. 957-973 (Year: 2012).*
Bazzani, Mario, et al., PC-Based Telephone Communication System for Deaf-Blind People, 1988 IEEE , pp. 0043-0047 (Year: 1988).*

* cited by examiner

CAPTIONING SYSTEM AND METHOD FOR THE VISION IMPAIRED

CROSS-REFERENCE TO RELATED APPLICALL ASSISTANTTIONS

This application is related to and claims priority to U.S. provisional patent application Ser. No. 62/051,158 which was filed on Sep. 16, 2014 and which is titled "Captioning System And Method For The Vision Impaired" which is incorporated herein in its entirety by reference.

STATEMENT REGARDING FEDERALLY SPONSORED RESEARCH

Not applicable.

BACKGROUND OF THE DISCLOSURE

The disclosure relates, in general, to relay systems for providing voice captioning for hearing and vision impaired users and, more particularly, to a telephone system and method for providing braille captioning for hearing and vision impaired users.

Hereinafter, in the interest of simplifying this explanation, unless indicated otherwise, a sight impaired (e.g., blind or simply impaired) and hearing impaired (e.g., deaf or only partially impaired) person (e.g., a deafblind person) using a communication system will be referred to as an "assisted user" and another person communicating with the assisted user that is not impaired will be referred to as a "hearing user". In addition, a communication device that can be used by a hearing impaired person to communicate with a hering user whereby the communication device broadcasts the hearing user's voice signals and also can present text corresponding to the hearing user's voice via a display screen will be referred to as a "captioned device". Moreover, a system that can convert a hearing user's voice signal to text will be referred to as a "relay" and a person at the relay that converts the hearing user's voice signal to text will be referred to as a "call assistant".

Captioned devices have similarities to standard telephones and may further include a display that outputs a text-based transcript of words a hearing user voices throughout a conversation with a hearing impaired person. A hearing impaired person using a captioned device may listen to a hearing user's voice signals as broadcast by a captioned device and also read text captions presented on a captioned device display. Examples of captioned devices and relay systems used therewith are described in U.S. patent application publication No. 2013/0308763 and U.S. Pat. Nos. 8,515,024, 5,909,482 and 6,603,835, each of which is incorporated herein in its entirety by reference.

In some cases a captioned device is designed to work on an analog public switched telephone network (PSTN), often called plain old telephone service (POTS), while other captioned devices may be designed to use a broadband internet connection or other type of communication connection to provide captioning. Systems that use the Internet are referred to as Internet Protocol (IP) captioned devices.

While captioned devices and associated relay systems that convert a hearing user's voice signal to text have been adopted broadly within the deaf community and are widely accepted and enjoyed among persons that have at least some hearing loss, unfortunately, these devices or similar devices have not been developed to help persons that are both hearing impaired as well as blind or at least sight impaired (e.g., deafblind persons referred to hereinafter as "assisted users"). There currently is a need for a communication system that enables assisted users to communicate with hearing and other persons in a manner that is more similar to the way in which two hearing persons can communicate using telephones or similar devices.

SUMMARY OF THE DISCLOSURE

Many blind people are trained to read braille. Conventional braille communication uses a set of six dots to indicate letters, numbers or other symbols where a blind person can feel the dots and distinguish one letter from others. A set of six dots is generally referred to as a character slot or character cell. A series of letters spells a word and therefore a series of character slots can be presented to spell out and therefore communicate a word. A series of words makes a sentence. In some cases the dots can be used to communicate meanings other than letters and numbers. In some cases, dots in a series of character slots can be used to indicate a specific symbol or meaning that is greater than simply the letters corresponding to presented dots.

Several dynamic electromechanical braille displays have been developed that can be used to present a stream of braille data to a blind person. Here, each dot in a character slot or display cell is separately controlled so that the dot can either be presented (e.g., pushed upward) or not (e.g., pulled downward). Exemplary braille displays include 14, forty, or more character slots, each of which can be controlled to independently present a letter, number, symbol, etc., or which can be controlled together to generate more meaningful symbols. Many blind and hearing impaired people already own or at least have access to a braille display.

It has been recognized that a captioned device for use by a hearing impaired person and an associated relay text captioning service can be used to drive a braille display so that a blind (or at least partially sight impaired) and hearing impaired person (e.g., an assisted user) can take advantage of relay and captioned device services to communicate more easily with other persons. In at least some cases, caption text corresponding to a hering user's voice signal that is generated via a relay may be converted to braille data and used to drive a braille display at an assisted user's location. In some cases the text to braille data conversion may be at the relay while in other cases, the conversion will take place at the captioned device itself which then feeds the braille data to the braille display.

Different braille display manufacturers use different types of braille data to drive their braille displays. For this reason, in at least some cases where a relay converts text to braille data, different text to braille data conversion processes may be supported so that data in the form required to drive a specific braille display is transmitted to an associated captioned device. In cases where a captioned device performs the text to braille conversion, the captioned device should be programmed to convert the text to the specific braille data type required to drive a linked braille display. Here, it is contemplated that a relay or other system server may maintain a set of text to braille data conversion applications including a separate application for each braille data type to be used within the system. When initially setting up a captioned device and braille display or when a new display type is initially linked to captioned device, during a commissioning procedure, an assisted user or proxy (e.g., a family member) therefore may step through a process whereby a text to braille data conversion application is selected and downloaded to the assisted user's captioned device. Thereafter, the captioned device would use the downloaded application to convert text received from the relay to braille data used to drive the braille display.

It has been recognized that, in many cases, assisted users (e.g., blind and hearing impaired persons) using a braille display need at least somewhat more time to comprehend words and phrases that are expressed via the display than do hearing persons using normal telephone devices or hearing impaired persons that use a captioned device to view text. For this reason, in many cases, transcription to braille data can be slower than conventional human conversation without affecting the experience of an assisted user. Because voice to braille data conversion can be slower than in other forms of communication, additional processing of a hearing user's voice data can be performed to increase transcription to braille data accuracy even if that processing requires additional time. For example, in at least some embodiments a call assistant may be able to consider text prior to conversion to braille data and may be able to correct the text during a longer period than is typical in a captioned device system. At least some embodiments of this disclosure contemplate different rules for determining when text is converted to braille data to better ensure accuracy without affecting the experience of an assisted user.

In at least some embodiments the hearing user's voce signal may be converted to text via automated voice to text transcription software and the call assistant may simply correct the transcribed text via a computer interface or the like. Automated voice to text software is particularly advantageous in a blind/hearing impaired case as a slower conversion process is acceptable given communication speed of most assisted users.

In blind/hearing impaired communication the possibility of confusion during a conversation is exacerbated by the fact that communications are often stopped and started routinely as an assisted user works to comprehend a hearing user's voice communications and to respond to those communications. In at least some embodiments it is contemplated that various types of signals may be provided to an assisted user and to a hearing user during a braille communication process to better inform communicating parties of how the communication is progressing which can reduce the possibility of confusion appreciably. For instance, when an assisted user is reading text via a braille display but is backlogged by several words or even sentences, in at least some embodiments, some type of audio warning or signal may be provided to a hearing user to indicate current status. For example, a recording of the hearing user's voice signal corresponding to the text currently being considered via the braille display may be played for the hearing user so that the hearing user can assess current status. In other cases, a pre-recorded message may be generated to indicate to the hearing user that the assisted user is busy understanding an earlier part of the hearing user's voice signal or a simple beep or other audio sound may be generated to communicate the same As another example, a signal may be provided to an assisted user indicating a current status of a buffer associated with the hearing user's voiced communications. For example, a buffer signal may indicate a buffer fill status so that the assisted user can determine when she is falling behind the hearing user's communications. Here, the buffer fill status may encourage the assisted user to try to speed up comprehension of the braille data generated by the braille display.

In most cases each character slot in a braille display includes eight dots and only six are required for generating letters and numbers and other symbols. Thus, here, the seventh and eight dots may be used to indicate buffer fill status to an assisted user. In other cases one or more of the character slots may be reserved for indicating buffer fill status of any other type of system information that should be communicated to the assisted user.

Where an assisted user can speak, in some cases the assisted user may simply use the voice capabilities of the captioned device to communicate back with a hearing user in voice. In other cases it is contemplated that the assisted user may use other types of data entry devices such as, for instance, a camera, a keyboard on a braille display, a conventional keyboard, etc. In some cases a call assistant will convert communications from the assisted user to voice that is then transmitted to the hearing user. In other cases, a software application may attempt to convert an assisted user's communications to voice to relieve the burden on the call assistant.

At least some embodiments include a communication system for communicating between a hearing user using a hearing user's communication device and an assisted user, the communication system comprising a relay that receives a hearing user's voice signal and converts that voice signal to text, a text to braille converter that receives the text generated at the relay and converts that text to braille data, a braille display device that is capable of generating braille messages that can be detected by an assisted user via touch and an assisted user's captioned device that receives the braille data and uses the braille data to drive the braille display device to generate braille messages for the assisted user to sense.

In some cases the conversion from the hearing user's voice signal to braille data is performed substantially in real time. In some cases the captioned device includes a display screen and wherein the converted text is presented via the display screen substantially in parallel with the presentation of the braille data. In some cases the conversion from text to braille data is performed at the relay.

In some cases the conversion from text to braille data is performed by the captioned device. In some embodiments, prior to converting the text to braille data, the text is presented to a relay call assistant via a display screen and corrections to the presented text are received from the call assistant to generate corrected text. In some embodiments the braille display device only includes a maximum display capability and wherein the text is converted to braille in subsets that are limited to the maximum display capability of the braille display device. In some embodiments text is only converted to braille data when a new braille message is requested via reception of a command from the assisted user.

T In some embodiments the captioned device transmits the portion of the hearing user's voice signal that corresponds to braille data presented in a message via the braille display when the message is initially presented via the braille display as feedback for the hearing user. In some embodiments the captioned device tracks the status of the communication between the assisted user and the hearing user and presents a signal to the hearing user via the braille display indicating the status.

In some embodiments the signal indicating call status is derived from the amount of braille data instantaneously stored in a braille buffer. In some embodiments the braille message is presented one word at a time via the braille display. In some embodiments the captioned device automatically periodically changes the braille data message presented to the assisted user.

In some embodiments the relay stores text in a text buffer prior to converting the text to braille data and wherein the rate at which the braille data message is changed is varied and is a function of the amount of data in the text buffer. In some cases braille data is stored in a braille data buffer prior to presentation via the braille display and wherein the rate at which the braille data message is changed is varied and is a function of the amount of data in the braille data buffer.

Other embodiments include a captioned device for use by an assisted user to communicate with a hearing user, the captioned device to be used with a relay and a braille display, the relay converting a hearing user's voice signal to text, the captioned device comprising a processor, a first link for connection to the relay to receive transcribed text from the relay during a conversation between the assisted user and the hearing user, a second link for connection to the braille display, wherein the processor is programmed to perform the steps of receiving text from the relay that corresponds to the hearing user's voice signal, converting the text to braille data suitable to drive the braille display and using the braille data to drive the braille display.

Still other embodiments include a captioned device for use by an assisted user to communicate with a hearing user, the captioned device to be used with a relay that converts a hearing user's voice signal to text, the captioned device comprising a processor, a display linked to the processor, a speaker linked to the processor, wherein the processor is programmed to perform the steps of substantially immediately upon receiving the hearing user's voice signal, broadcasting the hearing user's voice signal via the speaker for the assisted user to hear, receiving text from the relay that corresponds to the hearing user's voice signal wherein the text is delayed at least somewhat from the corresponding hearing user's voice signal, presenting the text via the display and receiving a skip ahead signal from the assisted user indicating that the assisted user audibly perceived the broadcast hearing user's voice signal and, in response to the skip ahead signal, skipping presenting text associated with at least a portion of the broadcast hearing user's voice signal via the display.

In some cases the processor is further programmed to, upon receiving the skip ahead signal, transmit a skip ahead message to the relay causing the relay to skip converting at least a portion of the already broadcast hearing user's voice signal to text. In some embodiments the display is a braille display. In some embodiments the display is an electronic visual display.

Other embodiments include a method for controlling a relay to be used with an assisted user's captioned device to enable an assisted user to communicate with a hearing user, the method comprising the steps of receiving and buffering a hearing user's voice signal, presenting the hearing user's voice signal to a call assistant, the call assistant converting the hearing user's voice signal to text, transmitting the text to the assisted user's captioned device to be displayed to the assisted user and receiving a skip ahead signal from the assisted user's captioned device and, in response to the skip ahead signal, skipping at least a subset of the buffered hearing user's voice signal so that the skipped portion is not presented to the call assistant for conversion.

In some embodiments the subset of the buffered hearing user's voice signal that is skipped includes substantially all of the hearing user's voice signal up to the time at which the skip ahead signal is received for which text has not been transmitted to the assisted user's captioned device.

The foregoing and other aspects and advantages of the disclosure will appear from the following description. In the description, reference is made to the accompanying drawings which form a part hereof, and in which there is shown by way of illustration a preferred embodiment of the disclosure. Such embodiment does not necessarily represent the full scope of the disclosure, however, and reference is made therefore to the claims and herein for interpreting the scope of the disclosure.

DETAILED DESCRIPTION OF THE DISCLOSURE

Figure 1:
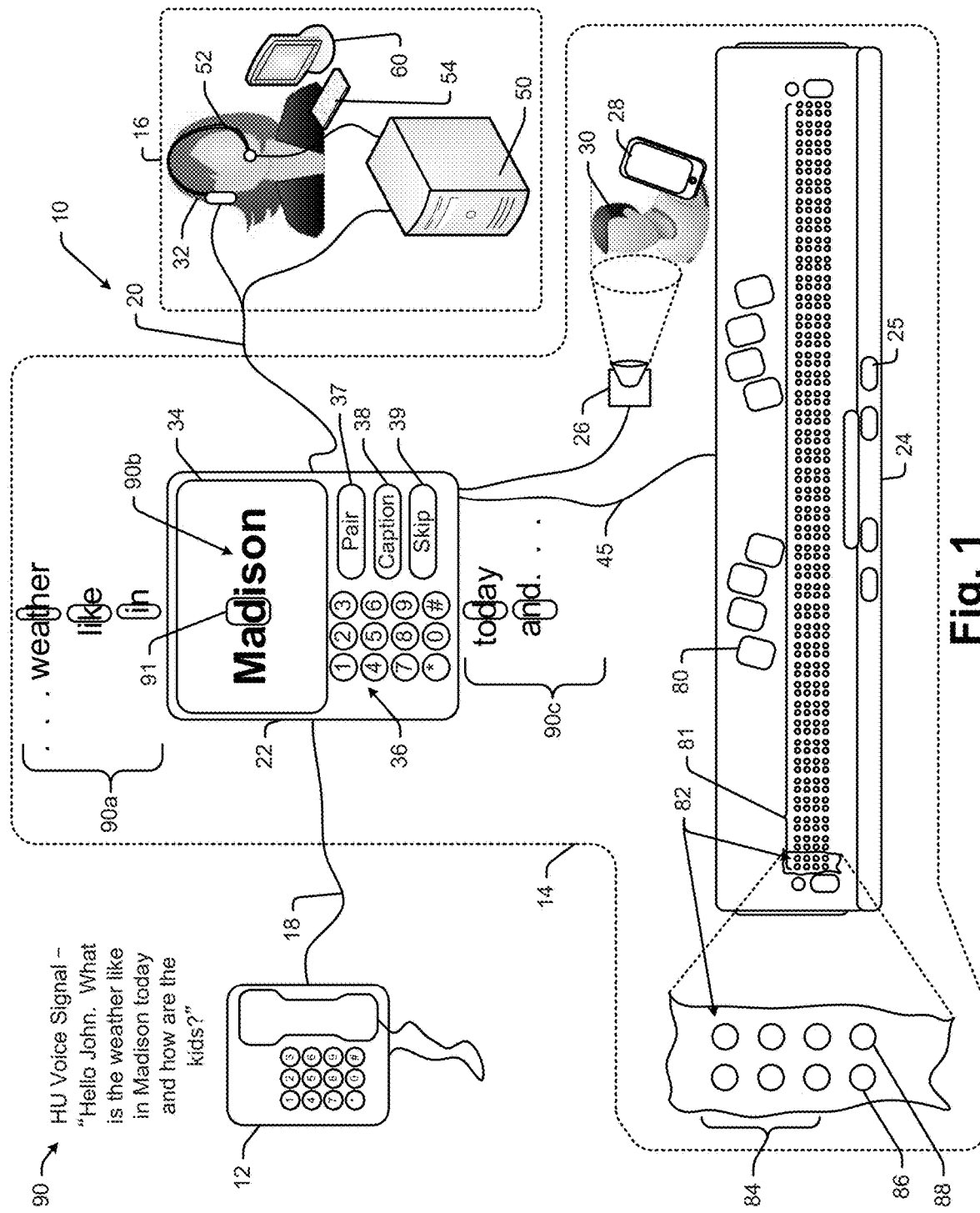
FIG. 1 is a schematic diagram that illustrates a communication system to facilitate communication between a sight and hearing impaired user and a hearing user whereby a hearing user's voice signals are transcribed to text at a relay and then the text is converted to braille data to drive a braille display at the assisted user's location.

The present disclosure is presented in several varying embodiments in the following description with reference to the figures, in which like numbers represent the same or similar elements. Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

The described features, structures, or characteristics of the disclosure may be combined in any suitable manner in one or more embodiments. In the following description, numerous specific details are recited to provide a thorough understanding of embodiments of the system. One skilled in the relevant art will recognize, however, that the system and method may both be practiced without one or more of the specific details, or with other methods, components, materials, and so forth. In other instances, well-known structures, materials, or operations are not shown or described in detail to avoid obscuring aspects of the disclosure.

Referring now to the drawings wherein like reference numerals refer to similar elements throughout the views and more specifically, referring to FIG. 1, the present disclosure will be described in the context of an exemplary communication system 10 that allows a hearing user (not illustrated) to communicate with an assisted user 30. Here, the assisted user is at least somewhat sight impaired and at least somewhat hearing impaired (e.g., generally referred to as "deafblind"). The hearing user uses a conventional telephone 12 that includes a handset having a speaker and a microphone so that voice and sound signals can be broadcast to the hearing user and the hearing user's voice signals can be captured to be transmitted to the assisted user, respectively.

Figure 2:
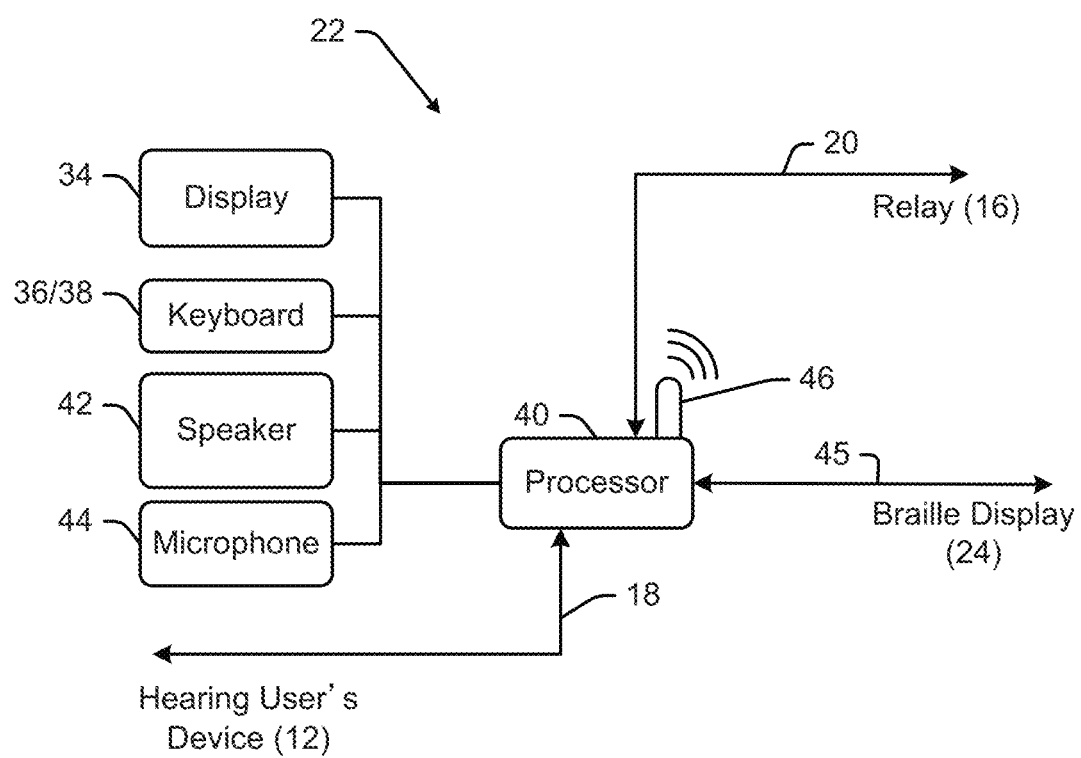
FIG. 2 is a schematic diagram illustrating exemplary components that may be included in the assisted user's captioned device shown in FIG. 1.

The assisted user 30 uses an assisted user's communication sub-system 14 which includes, among other things, a captioned device 22 and a braille display 24. Referring also to FIG. 2, captioned device 22 includes a captioned device processor 40, a display 34, a keyboard 36/38, a speaker 42 and a microphone 44, the processor 40 linked to the other captioned device components. Speaker 42 is controlled to, in at least some cases, broadcast a hearing user's voice signal immediately upon reception during communication. In cases where an assisted user is completely deaf it is contemplated that the hearing user voice broadcast feature may be turned off at the preference of the deaf assisted user or other persons in the vicinity of device 22 so that the hearing user's voice does not disturb others or to maintain the assisted user's privacy when communicating with a hearing user.

Microphone 44 picks up an assisted user's voice signals in at least some embodiments which can be transmitted to the hearing user's device 12 to be broadcast to the hearing user. Keyboard 36/38 includes a number keypad 36 as well as a captioning key 38 and perhaps other keys. The keypad 36 can be used to enter a phone number or other data. Key 38 is selectable to start a captioning process at any time while device 22 is being used to communicate with a hearing user. Here, it is contemplated that device 22 may, at times, be used by a person that can both speak and hear and therefore may simply operate as a conventional telephone device when key 38 is not selected or when key 38 is selected to toggle to a captions off state. Device 22 and more specifically processor 40 links to a hearing user's device 12 via a first communication link or line 18. When captioning is required, processor 40 links to relay 16 via second communication link or line 16. In addition, processor 40 can be linked to braille display 24 via a USB link 45 or wirelessly via a Bluetooth transceiver device 46.

Referring again to FIG. 1, displays like braille display 24 are well known in the art and therefore display 24 will not be described here in detail. Here, it should suffice to say that display 24 includes a dot matrix output or display subassembly 81 and braille input keys 80 where matrix display 81 includes forty character slots or cells, each including a set of eight dots arranged in two columns of four. An exemplary character slot or cell is labelled 82 in FIG. 1 where the top six dots 84 in the character slot are controlled via braille data to generate different dot patterns corresponding to letters, numbers and other symbols and the seventh and eight dots 86 and 88 may be controlled to indicate other information (e.g., a buffer fill status; an indication that a hearing user is speaking, etc.) to an assisted user. braille input keys 80 are conventional and will not be described here in detail except to say that an assisted user trained in braille typing can use keys 80 to enter braille data into device 24.

Referring still to FIG. 1, exemplary relay 16 includes a relay server 50 that is linkable to captioned device 22 via line 20 to receive the hearing user's voice signal from device 22 when captioning or braille output is required by the assisted user 30. The hearing user's voice signal is buffered by server 50 for conversion to text. In at least some cases the hearing user voice to text conversion is aided by call assistant 32 that listens to the hearing user's voice signal via a headset 52 and revoices that signal to voice to text transcription software run by server 50 and that is trained to the specific voice of the call assistant or that types the hearing user's voice signal in via keyboard 54 so that transcription to text is relatively accurate. In other cases a voice to text software application on server 50 may automatically convert the hearing user's voice signal to text. In this regard, it has been recognized that voice to text software that is not initially trained to a user's voice is now fairly good and can convert voice to text relatively accurately and quick enough for most deafblind user applications as in the present case.

In at least some cases, regardless of how the hearing user's voice is converted to text, the text is presented on a display screen 60 viewable by the call assistant 32 and allows the call assistant to edit the text to eliminate any inadvertent voice to text conversion errors.

After text is corrected, in at least some embodiments, the text is converted at the relay 16 to braille data which is then transmitted back to captioned device 22. When braille data is received at device 22, device transmits the braille data to braille display 24 which presents the braille data to the assisted user 30 via character cells 81.

Because a captioned device 22 may be used as a stand-alone captioned device to provide text and broadcast voice signals to a hearing impaired person or alternatively may be used to also drive a braille display 24, in at least some cases a signal is provided to relay 16 upon connection via line 20 indicating the type of data (e.g. either text, braille data or both text and braille data) to return to device 22. In addition, because different braille displays use different braille data formatting (e.g., different types of braille data), relay 16 must maintain a separate conversion process or method for each braille data type used within system 10 and a signal is provided to the relay indicating which type of braille display is associated with a captioned device 22 that links to relay 16 during a specific call. In other cases, an assisted user may specify service type and braille display type once and the relay server 50 may then simply associate that information with the assisted user's specific captioned device so that the correct service and braille data type are used automatically when the captioned device links to relay 16 until those settings or preferences are altered by an assisted user.

Figure 3:
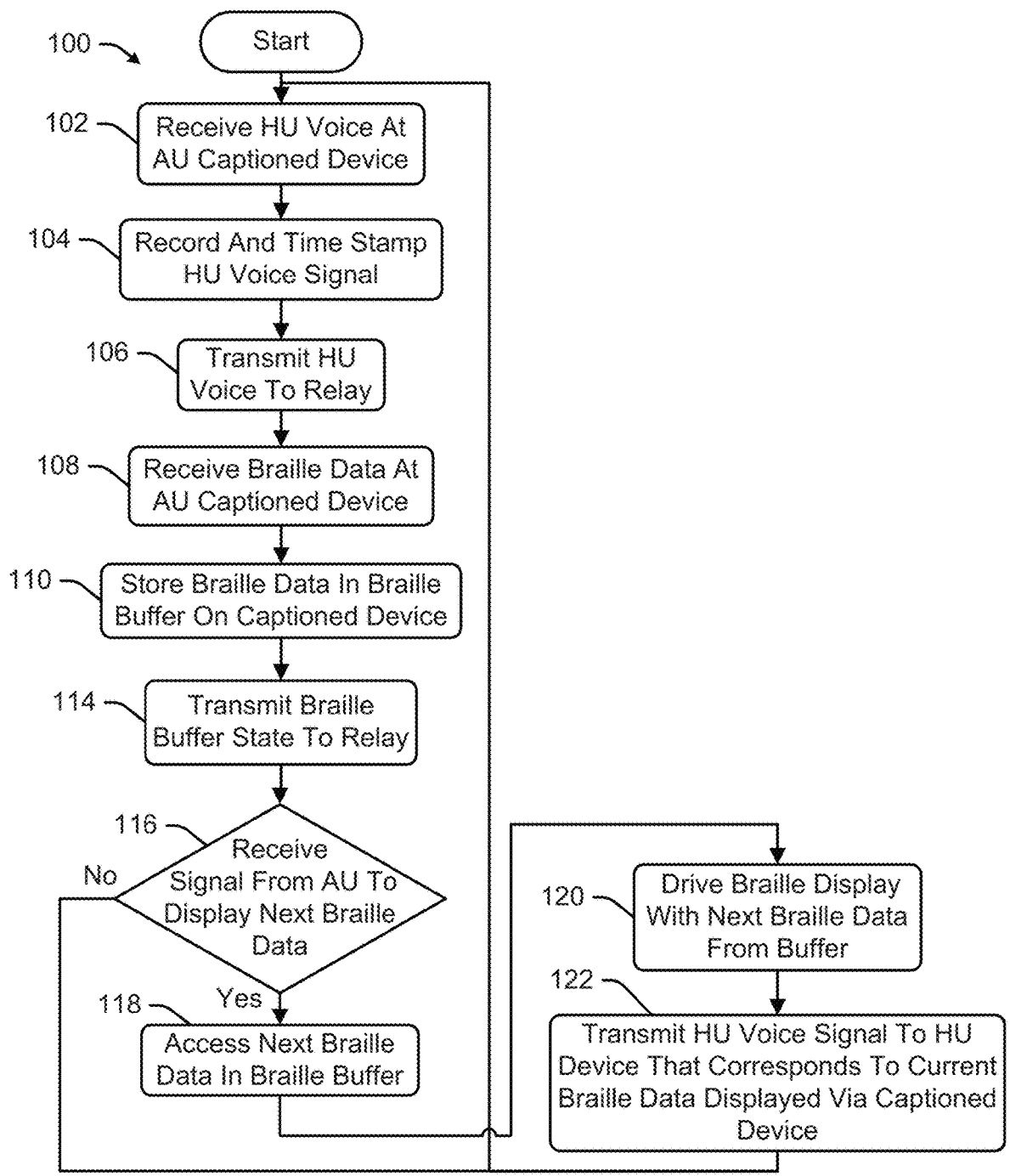
FIG. 3 is a flow chart illustrating one exemplary subprocess that may be performed by the assisted user's captioned device shown in FIGS. 1 and 2 that is consistent with at least some aspects of the present disclosure.
Figure 4:
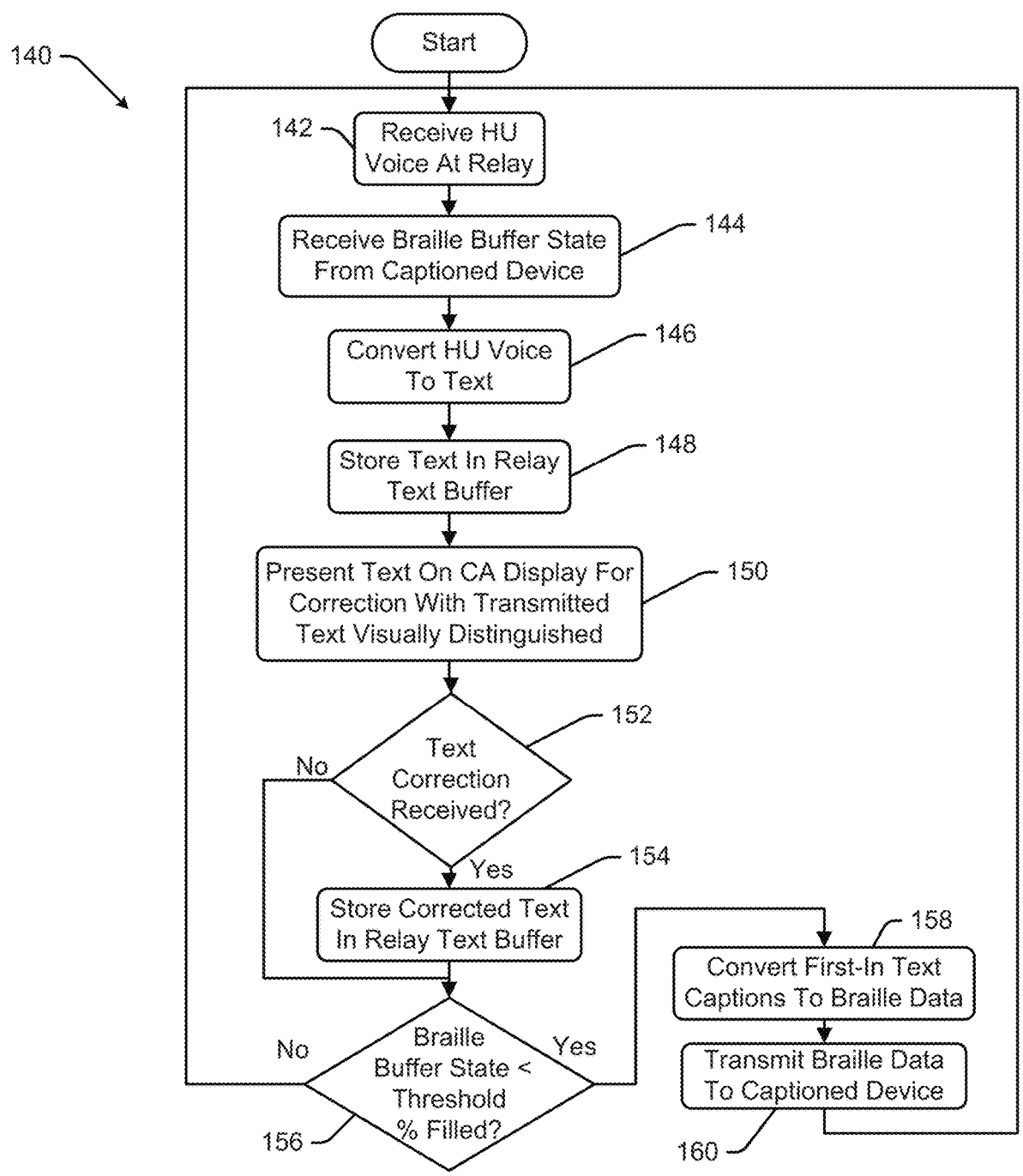
FIG. 4 is a flow chart illustrating one exemplary subprocess that may be performed by the relay shown in FIGS. 1 and 2 that is consistent with at least some aspects of the present disclosure.

Referring now to FIGS. 3 and 4, a process 100, 140 that may be performed using the system described above with respect to FIGS. 1 and 2 is illustrated that is consistent with at least some aspects of the present disclosure. The sub-process in FIG. 3 is performed by a captioned device 22 like the one illustrated in FIGS. 1 and 2 while the sub-process in FIG. 4 is performed at least somewhat in parallel at the relay 16. At block 102, a hearing user uses a hearing user's device 12 to call an assisted user associated with captioned device 22 or the assisted user uses her captioned device 22 to call a hearing user and, during a conversation, the hearing user's voice signal is received by captioned device 22. At block 104 the hearing user's voice signal is recorded in a first voice buffer by the captioned device 22. At block 106, the hearing user's voice signal is transmitted to relay 16. Although not shown, in at least some cases the hearing user's voice signal would also be broadcast to the assisted user at this time. The broadcast voice may aid assisted user communication in cases where an assisted user has at least some level of hearing capability.

Figure 5:
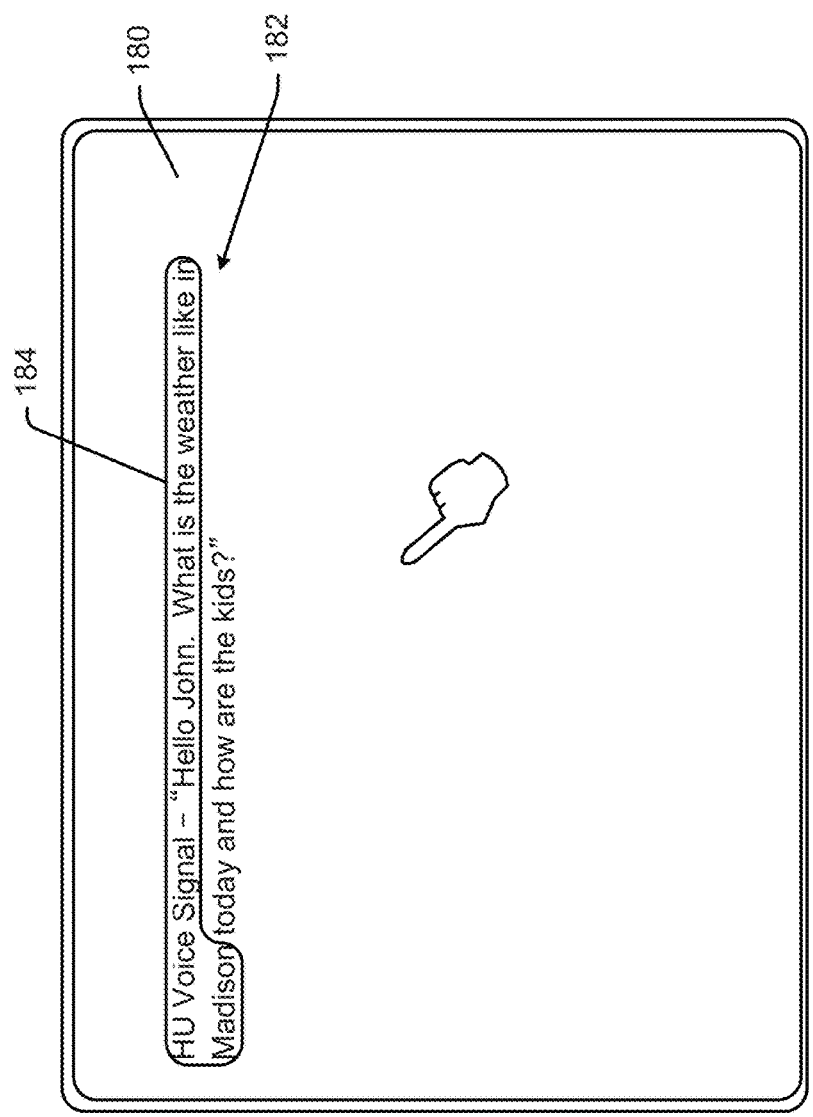
FIG. 5 is a screen shot illustrating a correction screen for captioned text that may be presented to a call assistant at the relay in FIG. 1 that is consistent with at least some aspects of the present disclosure.

Referring still to FIGS. 1 through 4 and specifically to FIG. 4, at block 142, the hearing user's voice signal is received at the relay. At block 144, a braille buffer state signal is received from the captioned device 22. The braille buffer state is described more hereafter. At block 146 the hearing user's voice signal is converted to text either automatically via voice to text software or by the call assistant 32 in any of several different ways known in the art. At block 148, the converted text is stored in a text buffer at the relay and at block 150 the converted text is presented on a display screen for the call assistant to view and make corrections. Here, text that has already been transmitted to the captioned device 22 for display is visually distinguished from text that has yet to be transmitted so that the call assistant can easily see which text can be corrected and make a difference to the assisted user. In at least some cases already transmitted text may be locked down so that, while presented to the call assistant, the text cannot be altered by the call assistant. To this end, see exemplary screen shot 180 in FIG. 5 where text corresponding to a hearing user's voice signal is shown at 182 with a box 184 around text that has already been transmitted to a captioned device 22 to visually distinguish that text from other text that can still be edited by the call assistant.

Referring again to FIG. 4, at block 152, if a text correction is received, at block 154 the corrected text is stored in the relay text buffer and control passes to block 156. At block 152, if no correction is received, control passes to block 156. At block 156, server 50 compares the braille buffer state to a threshold buffer fill value (e.g., 80% of capacity). Where the buffer state is less full than the threshold value, control cycles back up to block 142 where the process continues to cycle. If the buffer state fill value exceeds the threshold value, then control passes to block 158 where the oldest text in the relay text buffer that has not been transmitted to the captioned device is converted to braille data for the specific device 22 and at block 160 the braille data is transmitted to device 22. Here, in addition to transmitting the braille data, where captioned device 22 is set up to also present text, the transcribed text can be transmitted to captioned device 22 as well.

Referring again to FIG. 3, at block 108 braille data (and text if transmitted at block 160) is received by captioned device 22 and that data is stored in the braille buffer of device 22 at block 110.

At block 114, the braille buffer state is transmitted to the relay to be used in determining when additional braille data should be forwarded to captioned device 22. Thus, the braille buffer state in this case operates as an indication of where an assisted user is in the process of reviewing or comprehending a stream of braille data/transcribed text (e.g., an indication of the assisted user's instantaneous focus). Other indications of the assisted user's instantaneous focus are contemplated. For instance, the actual braille data currently presented to an assisted user may be indicated to the relay as an indication of the assisted user's focus.

While the relay 16 may convert text to braille data and transmit that data to a captioned device 22 for driving a braille reader 24, in other cases it is contemplated that the text to braille data conversion may be performed by the captioned device 22 that receives only text from the relay 16. In this case, each captioned device 22 needs to store a text to braille data conversion application that is specific to the braille display that the captioned device is to be used with. In at least some cases each braille display manufacturer will specify a braille data format required to drive its specific braille display and that information will be stored along with an association conversion application for the specific display on the relay server 50 or some other system server device. Here, when commissioning or setting up captioned device 22, a user will specify the type of braille display to be used with the captioned device 22 and that information will be used to request an appropriate conversion application from the system or relay server which will be downloaded to the captioned device processor 40 for storage and subsequent use.

In still other cases it is contemplated that device 22 may be programmed to discover the type of braille display and more specifically the braille data type needed to drive a display when the display is linked to the captioned device 22. Thereafter, captioned device 22 and the system servers can used the braille data type used by the braille display to configure device 22 to convert text to the appropriate braille data type.

In at least some cases, the rate of braille display on the braille display 24 will be manually controlled by the assisted user. For instance, in some cases one or a small number of words or phrases may be presented on display 81 at a time and a user may be required to select a device 24 button each time the displayed braille should be updated with a next set of braille data. To this end, at block 116, when a signal is received from an assisted user to advance the braille data displayed, control passes to block 118 where the next braille data in the buffer is accessed and then to block 120 where the next braille data is used to drive the braille display 24.

At block 122, the hearing user's voice signal that was time stamped at block 104 and that corresponds to the newly displayed braille data is transmitted back to hearing user at device 12 and is broadcast to the hearing user as an indication of where in the hearing user's communication sequence the assisted user is currently focusing. This revoiced signal is useful for a hearing user to understand any delays in communications from the assisted user. Here, the hearing user's voice signal that is replayed for the hearing user may be altered somewhat in pitch or tone to make it clear that the signal is not intended as a novel communication from the assisted user. In at least some cases the replayed hearing user's voice signal may only be provided at times when the assisted user is substantially behind in focusing on the braille data (e.g., at least 15 words behind a current point in the buffered data). Where the hearing user's voice signal is replayed for the hearing user, some type of filtering is required so that the replayed signal is not transmitted again to the relay 16 for conversion to text and braille data. Here, the replayed voice may be cancelled at the captioned device 22 or may be filtered out if the pitch or tone or some other sound characteristic can be detected that distinguishes that signal from the hearing user's voice signal.

Referring again to FIG. 3, at block 116, if the AU has not requested the next braille data, control passes back up to block 102 where the process described above continues to cycle.

In at least some embodiments an assisted user may not be able to communicate verbally with a hearing user and in those cases some other type of information input device is required. For instance, referring again to FIG. 1, in some cases the assisted user may use the braille display keyboard 80 to enter text which is transmitted by captioned device 22 to relay 16. In this case, the relay call assistant can read the text via display 60 and voice that text using headset 52 to generate an call assistant's voice signal which is transmitted back to captioned device 22 and on to the hearing user's device 12 to be broadcast. In other cases captioned device 22 may include a full text keyboard (not illustrated) that can be used to generate text. In this case the system would operate in a fashion similar to that described above where keyboard 80 was used to generate assisted user text.

In still other cases where the assisted user 30 is skilled at communicating via sign language, a camera 26 may be provided at the assisted user's location to generate video of sign language by the assisted user that can be converted to voice by the call assistant. Here, camera 26 may be linked to captioned device 22 in some cases and in other cases may be linked via a separate communication line or link (not illustrated) directly to relay 16. Other ways for the assisted user to input communications are contemplated.

In some cases the relay 16 may be programmed to convert text to braille data automatically after some predefined event occurs. For instance, in some cases the relay may automatically convert text to braille data for transmission if the text has been presented on the call assistant's display screen for more than 10 seconds. In other cases, a text correction by a call assistant may cause server 50 to start a 5 second countdown clock at the end of which the corrected text and any other text that precedes the corrected text is converted to braille data and transmitted. Here, the idea is that most call assistants correct text in sequence so that if a correction is made to one word in a text string, it is highly likely that the correction signifies that the call assistant is done considering the prior text in the stream.

In still other cases it is contemplated that text to braille data conversion and transmission may be tied to ther rule sets. For example, server 50 may generate a confidence factor in each word converted to text that reflects likelihood that the word has been correctly converted. Where the confidence factor in voice to text conversion is high, a word, phrase or even sentence may be converted and transmitted substantially faster than where conversion confidence factors are not as high.

In still other cases text generated at relay 16 may only be converted to braille data and transmitted to device 22 in a just in time fashion when additional braille data is requested by the assisted user. In this way, the text can remain correctable by the call assistant until the last possible moment and then quickly converted and transmitted to device 22. It is believed that the delay in text to braille data conversion and transmission will be minimal and, in effect, difficult for the assisted user to even perceive in most cases.

In cases where data is transmitted to a captioned device more rapidly than an assisted user "views" the data, the braille data buffer can fill up over time. In at least some cases it is contemplated that some type of buffer fill state signal may be provided to an assisted user as a sort of soft push to move along through the braille data set to unburden the buffer. For example, referring again to FIG. 1, the braille buffer state may be indicated using the seventh and eight dots 86 and 88 of one or more of the character slots 81 that are not used to convey letters, number or other symbols. In other cases the braille buffer state may be indicated using one or more of the character slots 81. In some cases, the state may be indicated simply as relatively empty, half full and relatively full while in other cases the state may be precisely indicated as a percentage of full. In some cases the each of the first (e.g., leftmost) and last (e.g. rightmost) character slits may independently indicate braille buffer status so that an assisted user can check status on either side of the braille display.

In some cases a braille display 24 may be equipped with a haptic feedback device that can generate other types signalling. For instance, when a braille buffer fill exceeds some threshold value, a braille display 24 may be controlled to vibrate as a quiet prompt to the assisted user to move along. As another instance, even where a braille display 24 is not equipped with a device that is intended to be controlled to vibrate, one or more of the character slot button sets may be controlled in rapid succession to vibrate the display 24 and provide a haptic signal independent of the signals presented via the other character slots.

In some cases it is contemplated that an assisted user may own or at least use some other device that can be used in conjunction with the system described above to receive system signaling. For instance, in many cases it is likely that an assisted user will own or have access to a smart phone, tablet or other type of portable computing device (see 28 in FIG. 1). In some cases, an assisted user may be able to register his other portable computing device with server 50 and/or the captioned device 22 to receive basic signalling associated with the system 10. For example, when an assisted user receives a call via captioned device 22, in addition to indicating the incoming call via an audible sound and/or a light device, captioned device 22 may generate a wireless signal and transmit that signal either directly to the registered portable device 28 or via a wireless router device in the vicinity of captioned device 22 (e.g., a home router device or the like) causing the portable device 28 to vibrate or otherwise provide a haptic indication of the incoming call.

In at least some cases, instead of having an assisted user manually indicate that a next braille data set should be presented for viewing, captioned device 22 may automatically advance the braille data set presented via display 24 at a rate that is typically comfortable for an assisted user to comprehend. Thus, for instance, a new set of words or phrases may be communicated via display 81 every few seconds until an assisted user indicates otherwise.

In some cases the rate at which braille data is displayed via display 81 may change automatically as a function of various operating parameters. For instance, because assisted users generally keep up with the beginning of a hearing user's turn to communicate and may be challenged thereafter to keep up with a braille data set, initial parts of each hearing user's turn may be presented for relatively short durations (e.g., 3 seconds) and subsequent parts may persist longer (e.g., 6 seconds) automatically.

In some cases several words will be presented via display 24 at the same time in a series and an assisted user will work her way down the length of the character slot matrix 81 to read those words.

In other cases, consistent with another aspect of the present disclosure, the Spritzing method developed by Spritz Inc. of visually presenting text for rapid reading may be used with the braille display 24 to help expedite the braille data viewing process. To this end, according the Spritz method, words in sentences are presented one word at a time in a single display field on a visual display. In addition, a generally central letter in each displayed word is highlighted to visually distinguish the letter from the other letters in the word. The highlighted letter in each consecutive word appears at the exact same location on the display screen irrespective of which word is instantaneous presented. In this regard, see the subset of consecutive words represented at 90*a* through 90*c* in FIG. 1 that correspond with a portion of the hearing user's voice signal labelled 90. At the instantaneous time illustrated in FIG. 1, the word "Madison" 90*b* is presented on screen 34 alone with the letter "d" highlighted and at a generally central location on the display 34. Prior to the displayed instant in FIG. 1, each of the words in subset 90*a* was separately displayed via display 34 with the highlighted letters as indicate (e.g., the word "in" was displayed prior to "Madison", the word "like" was displayed prior to the word "in", with the letters "i" and "k", highlighted, respectively. Similarly, subsequent to the displayed instant in FIG. 1, each of the words in subset 90*c* are to be separately displayed including the word "today" following the word "Madison" and the word "and" following the word "today" and the letters "d" and "n" highlighted, respectively. The idea here is that people generally can read text substantially faster using the Spritz method as opposed to more conventional methods of reading text.

While the Spritz representation of text may be useful when text is presented via captioned device 22, it is believed that the Spritz method will be even more advantageous in the context of a braille display. In this regard, when device 22 presents text, sometimes a seeing user refers to the text representation about a word for context and presenting a word in context allows a user to better understand the word by quickly referring back to prior text. Spritz does not allow a user the ability to refer back to text in context. In the case of a braille display, the display is only relatively short in many cases (e.g., 14 character slots) and therefore in many cases it is difficult to provide much context. In addition, blind assisted users, over time, maintain context in their heads relatively well so that it is rare to refer back to words in context during a reading activity. In effect, the context provided via words surrounding other words simply is less useful for blind assisted users.

In the case of a braille reader or display 24, consistent with the description above, words may be presented as a sequence of rapid individual words where a central or key letter is always presented via the same character slot (e.g., a generally central slot) in the slot matrix 81. In this way, while viewing a braille display, a blind person can simply maintain her fingers on specific character slots and be fed braille data relatively quickly to expedite the viewing process.

In some cases where a user has at least some ability to hear or see but still needs a braille display some of the time, the assisted user may be able to use a broadcast of the hearing user's voice signal or text presented via display 34 to comprehend some of what a hearing user is communicating and may need braille output other times. Where an assisted user comprehends a hearing user's voice message via some other signalling (e.g., broadcast or visual), in at least some cases, the braille display or even captioned device 22 may allow a user to indicate that the captioning and braille output should be skipped ahead to skip over next sections of the braille data. For instance, where an assisted user understands a broadcast of a hearing user's voice up to a current time, if the braille data buffer includes twenty five words, the assisted user recognizing that she understands the communication up to a current time, may select the "skip" pr "jump ahead" button 39 on device 22 to clear out the braille data buffer and catch up to a current time in the communication. A similar skip button 256 may be provided on display 24.

In some cases when captioned device 22 skips ahead, the device processor 40 may identify a next or most recent line of braille data or a "landmark" (e.g., a specific type of word) in the text. Examples of landmarks include an indicator placed by a call assistant or a particular or next grammatical phenomenon such as a verb, noun or a phrase.

Embodiments of the present disclosure may include one or more methods of translating captions to braille. In one example, a captioned device service platform may convert caption text to braille data. The resulting braille data may then be sent to a captioned device. In another example, a captioned device may send the captions as text to a braille enabled captioned device phone. In this case, the captioned device phone may include software or be otherwise configured to convert the text character data to braille data. In some embodiments, the braille data may be displayed using any method including those methods described herein. For example, the braille data may be presented to an assisted user with a refreshable braille display, terminal, or another electro-mechanical device for displaying braille characters. Furthermore, the braille data may be displayed in one or more formats such as uncontracted and contracted formats.

In one aspect, a braille display manufacturer may use one or more protocols for communicating data to and from a braille display devices. To support these options, a braille enabled captioned device may be configured to convert text to braille and to communicate with various braille displays. Alternatively (or in addition), braille data may be converted using a captioned device platform service. For example, a platform service may convert text captions into a desired braille format. The converted captions may then be sent to a braille enabled captioned device 22 (see again FIG. 1). In the case of the latter method, intelligence used for the conversion of text captions to braille captions may be centrally located (e.g., in a relay server or other system server) as opposed to stored on individual captioned devices. As a result, conversion protocols and other software or hardware may be enhanced or updated without releasing software or hardware updates to individual captioned devices. A centralized system may also be used to simultaneously convert the text to both uncontracted and contracted braille and send both streams to a captioned device for display, storage (e.g., for replay) or a combination thereof.

In some embodiments, communications drivers for various braille display devices may be loaded from a captioned device platform (e.g., a relay server). As described above, manufacturers of braille display devices may use various or proprietary protocols for communicating with a braille display device. While a display device may support a USB or a Bluetooth connection, the formatting of the data may be specific to the braille device. In one aspect, a phone system and method may include supporting each of a number of braille display devices with software included in a captioned device.

In another aspect, a captioned device phone may be configured to load an appropriate driver from a centralized captioned device platform. With respect to providing support from a central captioned device platform, a captioned device phone may use "dumb terminal" interactive capabilities established for interactive registration of internet protocol (IP) captioned device users. For example, a user wishing to configure a captioned device for their braille display device may enter a configuration menu. The captioned device phone may contact the captioned device platform for a current list of supported braille display devices. Thereafter, an assisted user may select a display device from a list. Based upon the user's selection, the captioned device phone may load a driver for that device from the platform. In this way, additional devices may be supported or updates made to the drivers without necessarily releasing new software to individual captioned device phones.

In one aspect, a phone system and method may include tracking the focus of a user. For a braille display that displays only one line of text at a time, the focus of an assisted user of the device may be tracked and relayed back to a relay in real-time. In one aspect, tracking what text an assisted user has displayed or is displaying at a given moment may enable a number of features and functions.

In one aspect, tracking the focus of an assisted user may enable a call assistant to correct or edit caption data prior to transmission of that data to the assisted user. For example, a captioning service may hold or delay sending text for a period of time before sending the data to a braille display. The data may be sent to the braille display when the user requests it by pressing a button on the captioned device phone or on a braille display. This may allow a call assistant to correct the text up to the point at which it has been called down to the user's device or display. A correction feature may include a way of displaying to the call assistant what the user has or has not displayed, thereby allowing the call assistant to correct the yet-to-be displayed text. Already displayed text may be locked down in order to prevent a call assistant from editing or further editing the already displayed text.

In another aspect, assisted braille display users may read at variable rates. For example, an assisted user may not read as quickly as visual readers. Therefore, the emphasis on the speed at which braille data is desired by a user may not be as great as compared with text-based captioning. Alternatively (or in addition) the rate at which braille is desired by an assisted user may not be constant over time (e.g., over the course of a turn or portion of a conversation). To better accommodate different needs of different assisted users, a captioning service may send captions to a captioned device of a user at different speeds or rates depending on where those captions occurred within the hearing party's turn at talk. Thus, whereas the first words sent to an assisted user's display may happen quite rapidly, subsequent words may be delayed somewhat in order to allow a call assistant to correct any errors. In effect, each word may receive a time value corresponding to where it occurs within a hearing party's turn at talk.

Alternatively, words may receive a time value relative to a voice recognition (VR) engine's degree of certainty regarding that word as an output choice. For example, words that a VR engine is more certain of may output faster than words that the VR engine is less certain of. A call assistant may be given a control mechanism to send the words on the display of the call assistant to the user prior to the expiration of the timer for sending those words automatically.

In one aspect, tracking the focus of an assisted user may enable the user to more readily navigate received braille data. By knowing where the focus of the user is relative to the amount of captions in the buffer (i.e., captions yet to be displayed to the user), a captioned device service may convey to a user how many lines of captioning they have yet to read. A phone may employ otherwise unused braille dots (e.g., dots 7 and 8, which correspond to the bottom row of braille dots on a display) or one or more braille cells on one end of a dynamic braille display to indicate how many lines of text are waiting to be displayed to the user.

One approach for enabling a user to navigate received braille data may include the output of one or more braille characters or character portions on a braille display. In one example, one or more braille cells at either end of a braille display may show a number indicating how many lines of text are waiting to be shown. In another example, one or more braille cells or portions of braille cells could be used to indicate that there are one or more lines waiting to be displayed to the user once they have finished reading their current line. In another example, a single cell may be used to show a letter (e.g. "S," "M," "L") to indicate the relative size of the buffer (i.e., the number of lines yet to be shown). In one aspect, an "S" may be displayed to indicate that a relatively small number of lines remain to be read (e.g., less than about 5 lines), an "M" may be displayed to indicate that a moderate number of lines remain to be read (e.g., about 5 to about 10 lines), and an "L" may be displayed to indicate that a relatively large number of lines remain to be read (e.g., greater than about 10 lines). In one aspect, a user of the braille display may be able to customize the one or more symbols or letters that are displayed for a given indication.

In still another example, the bottom row of dots in an 8-dot braille display, which are not typically used for the display of letters or numbers, may be raised to show the relation of the current focus line to the lines remaining. In another aspect, it may be useful to provide the braille captioned device user with a tactile indicator of when another party on the line (e.g., the hearing party) is speaking. One method may include displaying a dot or combination of dots in one or more braille cells or portions thereof. The one or more dots may be raised or lowered dynamically to indicate an aspect of the other party on the line, such as an indication that the other party is speaking.

In some embodiments, a phone system and method may include providing another party on the line with the user an indication of the activity of the assisted user. An activity of the assisted user may include that the user is reading the braille text, communicating with a call assistant, inputting text into system, placing the other party on hold, or that the assisted user has been disconnected from the call. In one aspect, the display of the assisted user may be tracked by the captioning service. The contents of the display may be used to enable the captioning service to provide some indication to another party of how much of the text the assisted user has read. This feedback may be used to help account for gaps in the conversation and to keep the other party (e.g., the hearing or unassisted user) from hanging up on the assisted user, or enable the other party to determine whether they should continue to speak and thereby add to the buffered text that the assisted user must read before the assisted user can respond.

Alerts or feedback that may be provided to another party based on the activity of the assisted user may include different types of beeps or chimes, a standard recording telling the other party to wait while the assisted user reads, or a playback of the line that the assisted user is reading. The latter option may have the benefit of reminding the other party as to what they said prior to receiving feedback from the assisted user. In the case of spoken feedback or alerts, either a live or synthesized voice may be provided. Moreover, an assisted user or another party may be able to choose from any number of synthesized voices to reflect gender, age, socio-geographic background, or the like.

The present disclosure further includes methods of connecting an assisted user with another party. In one aspect, an assisted user may wish to place a call to another party or another party may wish to place a call to an assisted user. Although a standard captioned device 22 relies on users who can voice for themselves but cannot hear well enough to participate in a telephone conversation, other methods of connecting may be used to allow an assisted user that may be both hearing and vision impaired (i.e., deafblind) to participate in telephone conversation.

In one aspect, a deafblind user that is capable of speech may not be capable of reading a graphical text display. Accordingly, a braille display may be used to display captions to the deaf/blind user. braille may be displayed in contracted or uncontracted form as set by the assisted user. Moreover, an assisted user with some residual hearing or a user that may only need occasional help with captions may wish to use a "jump ahead" or the "skip" feature described above to navigate through a given message. For example, a user may operate a jump ahead feature by pressing a particular button on their braille display or phone. Following actuation of the button or other aspect of the braille display or phone, the braille captions may advance to the most recent line or to a landmark in the text. Examples of landmarks include an indicator placed by the captioning assistant or a particular or next grammatical phenomenon such as a verb, noun or a phrase.

When an assisted user skips ahead based on an understanding of the broadcast of a hearing user's voice signal, in addition to clearing out at least a portion of a braille data buffer, the skip ahead command may cause activities at the relay 16 to skip ahead so that a call assistant is not attempting to transcribe or correct text that corresponds to a message already understood by the assisted user. In effect, the skip ahead should, in at least some cases, skip all efforts to present braille data to the assisted user ahead to eliminate the need for additional unnecessary efforts.

In certain situations, a user may be able to configure the manner in which text is transmitted to a display. One possible setting may include automatically displaying new text captions on the remaining cells of a braille display as the new text become available. Another possible setting a user may choose includes configuring a whole line to advance automatically after a set period of time or after recognizing that an assisted user had spoken (e.g., that the assisted user's turn has commenced). In the case of a braille display 24 having a 40 cell display or matrix with only 5 cells occupied by captions on the line in focus, a user may select that new captions be transmitted to the display and continue to fill the 40 cells on that line as opposed to displaying the text on the next line. Moreover, the system may monitor an outbound communication of a user. In one aspect, the system may interpret outbound communication as an indication of turn-taking. Thus, as new text captions arrive after a user has spoken or otherwise communicated, the system may automatically advance the braille display to the next line or be configured to fill the display with braille captions.

For a deafblind user that may not be able to speak and may not be capable of reading a graphical text display, other methods may be relied upon for connecting with a hearing user. For example, the deafblind user may type and the other party may be captioned. Words input by a user with a keyboard may be transmitted to a third party in a spoken voice by a call assistant or by a computer (i.e., a synthetic voice). As discussed previously, an assisted user may be able to select from any number of synthesized voices to reflect gender, age, socio-geographic background, or the like. A user may input a message with any type of peripheral or keyboard such as a Perkins or QWERTY keyboard attached to the braille display of a user.

A deafblind assisted user may further be provided with an interface to sign to a relay operator such as a video relay service (VRS) agent. The VRS agent may then speak directly to the other party on the line. The speech provided by the other party may be captioned, for example, by the VRS agent or a separate call assistant, and displayed on the braille display of the user. A VRS agent may be provided with a way to communicate with the braille captioned device user in order to provide information or instructions that may not conversational in nature. One example of non-conversation information may include information that is unrelated to the conversation of the braille captioned device user with the other party. Another example may include indicating to the deafblind user to sign more slowly, turn on lights, move in one direction, provide a spelling clarification or the like.

A VRS agent or other party may communicate with a deafblind user in one of several ways. In one example, an assisted user may be alerted to the presence of a message from the VRS agent or call assistant though the use of a secondary paging device (e.g., a cell phone or pager vibrator). In another example, a VRS agent or call assistant may be able to output to a dynamic braille display, such as the display in use by the braille captioned device user for reading captions of the conversation or a second braille display. In yet another example, VRS or call assistant instructions may be marked though the use of special characters or through the use of dots 7 and 8 on the braille display. The special characters or dots 7 and 8 may be include before, after or before and after the instruction in order to distinguish the VRS agent or call assistant instructions or information from the conversation captions.

Another aspect of a phone system and method may include a VRS agent or other operator speaking into a voice recognition system when voicing for the deafblind user. This approach may enable the deafblind user to review portions of a message that has been conveyed to the other party on the line. In one aspect, a VRS agent may speak into the voice recognition system while voicing for the deafblind user, thereby allowing the other party to hear and enabling the deafblind user to review the conveyed message. In some embodiments, a VRS agent or call assistant may operate a manual or automatic switch to prevent the other party from hearing each of the words spoken by the other party repeated by the VRS agent or call assistant to the voice recognition system for captioning.

In some embodiments, a phone system and method may include displaying text to the user. For users with a limited field of vision, it may be useful to present graphical or braille text in a series of single words or short phrases. As described in U.S. Patent No. 2014/0016867 to Maurer et al., text from the captioned device service may be buffered and displayed in a manner that justifies the graphic representation of a word around a single optimal recognition point as in the case of the Spritz reading method described above.

In some embodiments, text may be displayed to the user by varying the speed of serial word playback. The speed of serial word playback may be tied to the number of words in the buffer with reference to how many words are left to be displayed. For example, text may display faster when there are several words left to be displayed or slower when only a few words are left to be displayed. In another example, braille captions may be displayed serially in such a way as to allow a user to maintain their fingers in a single location or to move only minimally in order to feel the entire word presented the braille display.

In a further aspect, captions may be presented linearly or non-linearly. One method may include the actuation of a button by a user to switch the presentation mode to another text display mode (e.g., using the Spritzing technology from Spritz, Inc). One mode may enable a user to jump back in the text and replay several words in succession. Another mode may enable a user to switch between text display modes without backtracking or jumping back. In one aspect, a back tracking function may operate based on time, by searching for relevant phenomena (e.g., turn transitions, periods of long silence, and the like) or combinations thereof.

In some embodiments, a phone system and method may include a speech indicator for a user. Captioned devices may include a visual indication that there is audio or speech on the telephone line. For a hearing impaired user, the visual indicator may provide an understanding of what is happening on the telephone line. For example, a visual indicator may indicate that it is the turn of a user to talk, that the other party is speaking but there are no captions and, therefore, something is wrong, or the like. For a braille user, it may be useful to provide a tactile speech indicator. A speech indicator may include an unused braille display cell or a portion thereof (e.g., the seventh and eighth dots in a cell), or another tactile element that may only be active when there is audio on the telephone line. In some embodiments, it may be useful to modulate a tactile indicator to correspond with the relative intensity of the audio on the telephone line.

In one aspect, the tactile speech indicator may be a separate device that is worn or placed in a pocket (e.g., a smart phone or the like that can be wirelessly linked and that can generate a haptic signal). A separate device may enable a user to receive information without necessarily interfacing with the braille display. In another aspect, a tactile indicator may be used to alert a user to place their hands on the braille display to receive status information or another type of information from the captioned device or the captioning system overall. In one example, a specific vibration cadence may be used to alert a user that the telephone is ringing or that the captioned device phone has status information that may be read on the braille display. In another example, a specific vibration cadence may be used to alert an assisted user of a voice mail message. The alert may further include information related to the party that left the message, the time the message was sent, the urgency level of the message and the like.

The present disclosure has been described in terms of one or more preferred embodiments, and it should be appreciated that many equivalents, alternatives, variations, and modifications, aside from those expressly stated, are possible and within the scope of the disclosure.

Each reference identified in the present application is herein incorporated by reference in its entirety.

While present inventive concepts have been described with reference to particular embodiments, those of ordinary skill in the art will appreciate that various substitutions and/or other alterations may be made to the embodiments without departing from the spirit of present inventive concepts. Accordingly, the foregoing description is meant to be exemplary, and does not limit the scope of present inventive concepts.

A number of examples have been described herein. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the present inventive concepts. For example, the relay system described above in conjunction with FIG. 1 is commonly referred to as a two line system where an assisted user's captioned device 22 is located between a hearing user's phone device 12 and a relay 16. While there are certain advantages associated with a two line system, many of the features described herein could be employed in a single line relay system where a relay is located between an assisted user's captioned device and a hearing user's phone device and the present disclosure, unless indicated otherwise, is not to be limited to a two line system.

In addition, while the concepts described above are generally interesting in cases where the system is to support a deaf and hearing impaired assisted user, at least some of the aspects described above could be used in systems intended to support seeing assisted users that are at least hearing impaired. For instance, the idea of enabling an assisted user to skip ahead in text and braille presentation when the user understands the broadcast of a hearing user's voice at will would be useful nd indeed valuable to a hearing user as well as to a blind user. By allowing a user to skip ahead when she understands a broadcast voice expedites the communication process and therefore would be valuable.

As another instance, the concept of providing alerts to a blind assisted user via a smart phone or other portable computing device when a call is incoming would be useful to a seeing hearing impaired user as well as to a deaf user. Thus, this feature could be provided in a conventional captioned device system that does not include a braille display.

In some embodiments where a captioned device and braille display are only to be used by a completely blinds assisted user or an assisted user that is not interested in text captioning, the captioned device 22 in FIG. 1 may be replaced by a router device that performs all of the operations of the captioned device 22 described above except for the operations whereby text are presented via the display 34.

While an indication of a braille fill buffer state is described above, it should be understood that other call status indications may be provided to an assisted user. For instance, the number of seconds of a hearing user's voice signal that has been received by captioned device 22 or relay 16 that has not been presented in braille form to the assisted user may form the foundation of another call status signal that could be indicated via the braille display to an assisted user. In an alternative, the number os seconds or number of words of text transcribed but not yet presented to the assisted user may be used to generate another call status signal. Other call status or turn indicating signals are contemplated.

In many cases, an assisted user will use her braille display at times in ways that are independent of a captioned device 22 (see again FIG. 1). For instance, in some cases a blind user will use her braille display with a smart phone or other device to perform various activities. Most braille displays that have wireless capabilities can only have a single wireless connection at a time. For this reason, in many cases an assisted user will need to or want to change a wireless (e.g., Bluetooth, WIFI, etc.) pairing fairly regularly.

Unfortunately, in the case of a deafblind assisted user, changing paring of a braille display with other devices is difficult. To this end, using a known existing captioned device, pairing a braille display to the captioned device would require a user to cause the captioned device 22 to query for wirelessly linkable devices within a broadcast range of the device 22 or some other linked wireless device (e.g., a wireless home or office router) and then, when a list of possibly linkable devices is identified, to select the braille display for pairing. Obviously a deafblind assisted user would have difficulty using display 34 to provide commands to the captioned device processor to initiate a paring sequence and ultimately select the braille display from a list of devices.

In at least some cases it is contemplated that captioned device 22 may be equipped to automatically pair with an assisted user's braille display upon receiving a command to pair. To this end, in at least some cases it is contemplated that when device 22 is initially commissioned by an assisted user or a proxy therefore, a preferred wirelessly linkable device may be selected and that preference may be stored in a memory accessible by processor 40 (see again FIG. 2) each time captioned device is used to initiate a new wireless pairing. To enable a blind user to initiate a new pairing, in at least some cases it is contemplated that a specific pairing button 37 (see again FIG. 1) that can be tactilely located by a blind person may be presented on the captioned device 22. In FIG. 1, to pair device 22 with display 24, a blind person would tactilely locate button 37 on device 22 and press that button. Upon activating button 37, device 22 identifies display 24 as a preferred wireless device to pair with, searches the vicinity to determine if display 24 is present for pairing and if so, sets up a wireless communication channel with display 24 to facilitate a braille communication link.

While the automatic display pairing described above is advantageous for a blind assisted user, it is contemplated that wireless automatic pairing would also be useful with other wireless devices used by other assisted users that are impaired in other ways. For instance, in a case where the assisted user is hearing impaired, the assisted user or a proxy may select some other wireless device as a preferred device for automated pairing when button 37 or some other control button (e.g., a virtual button presented on display screen 34) is selected. For example, a hearing impaired person may opt for a wireless pairing with a set of high quality earphones or a hearing implant device or some other device. Here, captioned device 22 would automatically pair with the assisted user's preferred wireless device upon selection of the pairing activator button, icon, etc.

In at least some cases it is contemplated that the braille display 24 may be programmed to operate with essentially any braille data type. In this case, the need to download a specific application to device 22 for a specific braille data type would not be required. Instead, captioned device 22 could simply provide braille data of one type to the display 24 and the display 24 would then use that data to drive the tactile display.

What is claimed is:

1. A communication system for communicating between a hearing user using a hearing user's communication device and an assisted user, the communication system comprising:
   a relay that receives a hearing user's voice signal and converts that voice signal to text;
   a text to braille converter that receives the text generated at the relay and converts that text to braille data;
   a braille display device that is capable of generating braille messages that can be detected by an assisted user via touch; and
   an assisted user's captioned device that receives the braille data and uses the braille data to drive the braille display device to generate braille messages for the assisted user to sense; and
   wherein the captioned device transmits the portion of the hearing user's voice signal that corresponds to braille data presented in a message via the braille display when the message is initially presented via the braille display as feedback for the hearing user.

2. The communication system of claim 1 wherein a conversion from the hearing user's voice signal to braille data is performed substantially in real time.

3. The communication system of claim 1 wherein the captioned device includes a display screen and wherein the converted text is presented via the display screen substantially in parallel with the presentation of the braille data.

4. The communication system of claim 1 wherein, prior to converting the text to braille data, the text is presented to a relay call assistant via a display screen and corrections to the presented text are received from the call assistant to generate corrected text.

5. The communication system of claim 1 wherein the braille display device only includes a maximum display capability and wherein the text is converted to braille in subsets that are limited to the maximum display capability of the braille display device.

6. The communication system of claim 1 wherein the captioned device transmits the portion of the hearing user's voice signal that corresponds to braille data presented in a message via the braille display when the message is initially presented via the braille display as feedback for the hearing user.

7. The communication system of claim 1 wherein the braille message is presented one word at a time via the braille display.

8. A communication system for communicating between a hearing user using a hearing user's communication device and an assisted user, the communication system comprising:
   a relay that receives a hearing user's voice signal and converts that voice signal to text;
   a text to braille converter that receives the text generated at the relay and converts that text to braille data;
   a braille display device that is capable of generating braille messages that can be detected by an assisted user via touch; and
   an assisted user's captioned device that receives the braille data and uses the braille data to drive the braille display device to generate braille messages for the assisted user to sense; and
   wherein text is only converted to braille data when a new braille message is requested via reception of a command from the assisted user.

9. A communication system for communicating between a hearing user using a hearing user's communication device and an assisted user, the communication system comprising:
   a relay that receives a hearing user's voice signal and converts that voice signal to text;
   a text to braille converter that receives the text generated at the relay and converts that text to braille data;
   a braille display device that is capable of generating braille messages that can be detected by an assisted user via touch; and
   an assisted user's captioned device that receives the braille data and uses the braille data to drive the braille display device to generate braille messages for the assisted user to sense; and
   wherein the captioned device tracks the status of the communication between the assisted user and the hearing user and presents a signal to the hearing user indicating the status.

10. The communication system of claim 9 wherein the signal indicating call status is derived from the amount of braille data instantaneously stored in a braille buffer.

11. The communication system of claim 9 wherein the captioned device automatically periodically changes the braille data message presented to the assisted user.

12. The communication system of claim 11 wherein braille data is stored in a braille data buffer prior to presentation via the braille display and wherein the rate at which the braille data message is changed is varied and is a function of the amount of data in the braille data buffer.

13. A communication system for communicating between a hearing user using a hearing user's communication device and an assisted user, the communication system comprising:
   a relay that receives a hearing user's voice signal and converts that voice signal to text;
   a text to braille converter that receives the text generated at the relay and converts that text to braille data;
   a braille display device that is capable of generating braille messages that can be detected by an assisted user via touch;
   an assisted user's captioned device that receives the braille data and uses the braille data to drive the braille display device to generate braille messages for the assisted user to sense;

wherein the captioned device automatically periodically changes the braille data message presented to the assisted user; and wherein the relay stores text in a text buffer prior to converting the text to braille data and wherein the rate at which the braille data message is changed is varied and is a function of the amount of data in the text buffer.

\* \* \* \* \*